(12) United States Patent
Campagna et al.

(10) Patent No.: US 11,258,769 B2
(45) Date of Patent: *Feb. 22, 2022

(54) PROVISIONING NETWORK KEYS TO DEVICES TO ALLOW THEM TO PROVIDE THEIR IDENTITY

(71) Applicant: Amazon Technologies, Inc., Seattle, WA (US)

(72) Inventors: Matthew John Campagna, Bainbridge Island, WA (US); Derek Del Miller, Austin, TX (US); Nachiketh Rao Potlapally, Arlington, VA (US); Gregory Branchek Roth, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 232 days.

This patent is subject to a terminal disclaimer.

(21) Appl. No.: 16/450,801

(22) Filed: Jun. 24, 2019

(65) Prior Publication Data

US 2019/0312851 A1    Oct. 10, 2019

Related U.S. Application Data

(62) Division of application No. 14/741,375, filed on Jun. 16, 2015, now Pat. No. 10,333,903.

(51) Int. Cl.
*H04L 29/06* (2006.01)
*H04L 12/46* (2006.01)

(52) U.S. Cl.
CPC ...... *H04L 63/0428* (2013.01); *H04L 12/4641* (2013.01); *H04L 63/061* (2013.01);
(Continued)

(58) Field of Classification Search
CPC . H04L 63/0428; H04L 63/061; H04L 63/062; H04L 63/0823; H04L 63/0442; H04L 12/4641

See application file for complete search history.

(56) References Cited

U.S. PATENT DOCUMENTS

| | | | | |
|---|---|---|---|---|
| 7,734,911 B2 * | 6/2010 | Ganesan | ............... | H04L 9/0825 713/155 |
| 8,578,467 B2 * | 11/2013 | Ronda | ................. | H04L 63/0853 726/10 |

(Continued)

FOREIGN PATENT DOCUMENTS

WO    2014016621 A1    1/2014

OTHER PUBLICATIONS

Intel, "Preboot Execution Environment (PXE) Specification Version 2.1," Sep. 20, 1999, retrieved Dec. 9, 2019, from http://www.pix.net/software/pxeboot/archive/pxespec.pdf, 103 pages.

(Continued)

*Primary Examiner* — Sarah Su
(74) *Attorney, Agent, or Firm* — Davis Wright Tremaine LLP

(57) ABSTRACT

A device is provisioned and authorized for use on a network. The device may generate a cryptographic key and provide a digital certificate the cryptographic key, a hardware identifier, and attribute information and provide such information to an authorization host as part of the provisioning process. The authorization host may use attribute information to determine whether to authorize the device for use on the network, and whether the generated cryptographic key should be trusted for use on the network.

20 Claims, 6 Drawing Sheets

(52) U.S. Cl.
CPC ........ *H04L 63/062* (2013.01); *H04L 63/0823* (2013.01); *H04L 63/0442* (2013.01)

(56) References Cited

U.S. PATENT DOCUMENTS

| | | | |
|---|---|---|---|
| 8,589,691 | B1 | 11/2013 | Hackborn |
| 8,621,244 | B1* | 12/2013 | Rembert ............. G06F 21/6245 713/193 |
| 9,736,147 | B1* | 8/2017 | Mead .................... H04L 9/3239 |
| 2001/0002485 | A1 | 5/2001 | Bisbee et al. |
| 2003/0115452 | A1 | 6/2003 | Sandhu |
| 2005/0033994 | A1* | 2/2005 | Suzuki ............... H04N 7/17318 726/19 |
| 2006/0137007 | A1 | 6/2006 | Paatero |
| 2007/0005955 | A1 | 1/2007 | Pyle et al. |
| 2008/0215878 | A1 | 9/2008 | Gemmo |
| 2008/0256595 | A1 | 10/2008 | Schunter |
| 2008/0293411 | A1 | 11/2008 | Hinton |
| 2009/0006844 | A1 | 1/2009 | Wing |
| 2009/0222674 | A1 | 9/2009 | Leichsenring |
| 2009/0222902 | A1 | 9/2009 | Bender et al. |
| 2009/0239503 | A1 | 9/2009 | Smeets |
| 2009/0254749 | A1 | 10/2009 | Li |
| 2009/0323941 | A1 | 12/2009 | Sahita et al. |
| 2010/0033300 | A1 | 2/2010 | Brandin |
| 2010/0146609 | A1 | 6/2010 | Bartlett |
| 2010/0241836 | A1 | 9/2010 | Proudler |
| 2010/0287369 | A1 | 11/2010 | Monden |
| 2011/0010543 | A1 | 1/2011 | Schmidt et al. |
| 2011/0047378 | A1 | 2/2011 | Chen |
| 2011/0145585 | A1 | 6/2011 | Campagna et al. |
| 2012/0005474 | A1 | 1/2012 | Bourret |
| 2013/0318343 | A1 | 11/2013 | Bjarnason et al. |
| 2013/0332542 | A1 | 12/2013 | Foo |
| 2014/0181521 | A1 | 6/2014 | Hemphill |
| 2015/0222435 | A1 | 8/2015 | Lea |
| 2015/0304847 | A1 | 10/2015 | Gong |
| 2016/0212194 | A1 | 7/2016 | Palin |
| 2016/0217301 | A1 | 7/2016 | Watanabe |
| 2016/0373257 | A1 | 12/2016 | Adrangi |
| 2017/0208461 | A1 | 7/2017 | Yin |
| 2018/0007018 | A1 | 1/2018 | Valenti |
| 2018/0176188 | A1 | 6/2018 | Zhu |

OTHER PUBLICATIONS

International Standard, "Information technology—Trusted Platform Module—Part 2: Design Principles," International Organization for Standardization/International Electrotechnical Commission ISO/IEC 11889-2:2009(E), May 15, 2009, 152 pages.

International Standard, "Information technology—Trusted Platform Module—Part 3: Structures," International Organization for Standardization/International Electrotechnical Commission ISO/IEC 11889-3:2009(E), May 15, 2009, 204 pages.

International Standard, "Information technology—Trusted Platform Module—Part 4: Commands," International Organization for Standardization/International Electrotechnical Commission ISO/IEC 11889-4:2009(E), May 15, 2009, 254 pages.

International Standard, "Information technology—Trusted Platform Module—Part 1: Overview," International Organization for Standardization/International ElectrotechnicalCommission ISO/IEC 11889-1:2009(E), May 15, 2009, 20 pages.

Trusted Computing Group, Inc., "TPM Main: Part 1 Design Principles—Specification Version 1.2—Level 2 Revision 103," Jul. 9, 2007, 182 pages.

Trusted Computing Group, Inc., "TPM Main: Part 1 Design Principles—Specification Version 1.2—Revision 116," Mar. 1, 2011, 184 pages.

Trusted Computing Group, Inc., "TPM Main: Part 2 TPM Structures—Specification Version 1.2—Level 2 Revision 103," Jul. 9, 2007, 198 pages.

Trusted Computing Group, Inc., "TPM Main: Part 2 TPM Structures—Specification Version 1.2—Revision 116," Mar. 1, 2011, 201 pages.

Trusted Computing Group, Inc., "TPM Main: Part 3 Commands Specification Version 1.2—Level 2 Revision 103," Jul. 9, 2007, 330 pages.

Trusted Computing Group, Inc., "TPM Main: Part 3 Commands—Specification Version 1.2—Revision 116," Mar. 1, 2011, 339 pages.

* cited by examiner

PROVISIONING NETWORK KEYS TO DEVICES TO ALLOW THEM TO PROVIDE THEIR IDENTITY

CROSS-REFERENCE TO RELATED APPLICATIONS

This application is a divisional of U.S. patent application Ser. No. 14/741,375, filed Jun. 16, 2015, and issued as U.S. Pat. No. 10,333,903 on Jun. 25, 2019, entitled "PROVISIONING NETWORK KEYS TO DEVICES TO ALLOW THEM TO PROVIDE THEIR IDENTITY," the disclosure of which is hereby incorporated herein by reference in its entirety.

BRIEF DESCRIPTION OF THE DRAWINGS

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. In many instances, organizations configure and operate remote networks using hardware manufactured externally, thereby reducing infrastructure costs and achieving other advantages. With such configurations of computing resources, ensuring that access to the resources and the data they hold is secure can be challenging, especially as the size and complexity of such configurations grow.

In many instances, a network may, for security reasons, require computer hardware and/or software on the network to be authorized for use on the network. A mechanism for authorizing specific devices for use on a network is to provide authorized devices with a digital certificate that can be verified on the network.

An organization utilizing networks of computing devices may not have the ability, capacity, or desire to manufacture its own hardware. Instead, the organization may purchase computing devices from a third-party manufacturer. In instances where devices are authorized to a network with a digital certificate, the organization may provide a digital certificate or digital certificate generation mechanism to the third-party manufacturer. However, providing the digital certificate or digital certificate generation mechanism to a third-party manufacturer may not provide sufficient assurances of security to the organization—for example, ensuring that the third-party manufacturer does not create a rogue device that may be used to infiltrate the organization's network, or ensuring that a malicious party does not steal the digital certificate or digital certificate generation mechanism and use it to create a rogue device that may be used to infiltrate the organization's network typically requires complicated and extensive effort.

BRIEF DESCRIPTION OF THE DRAWINGS

Figure 1:
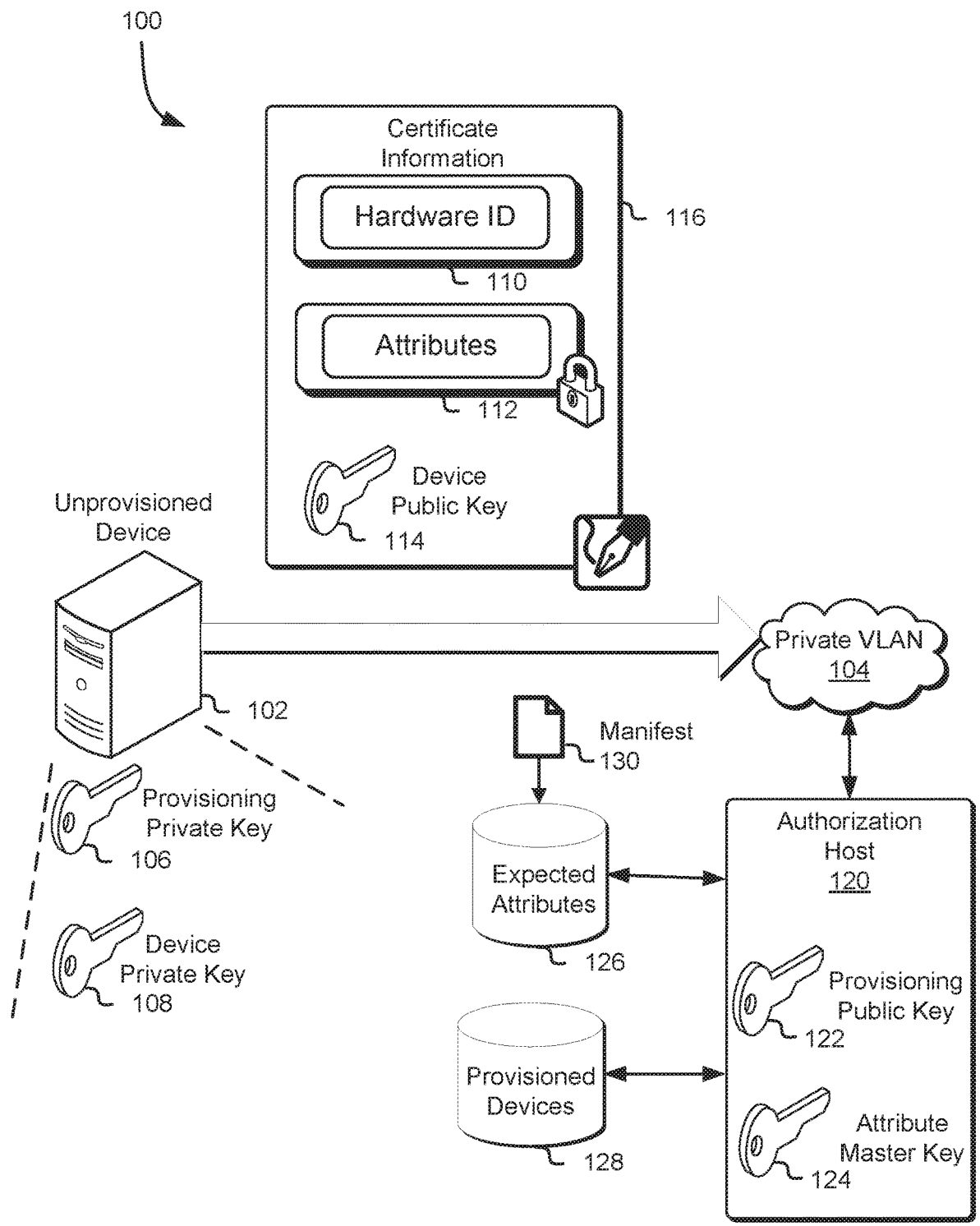
Figure 2:
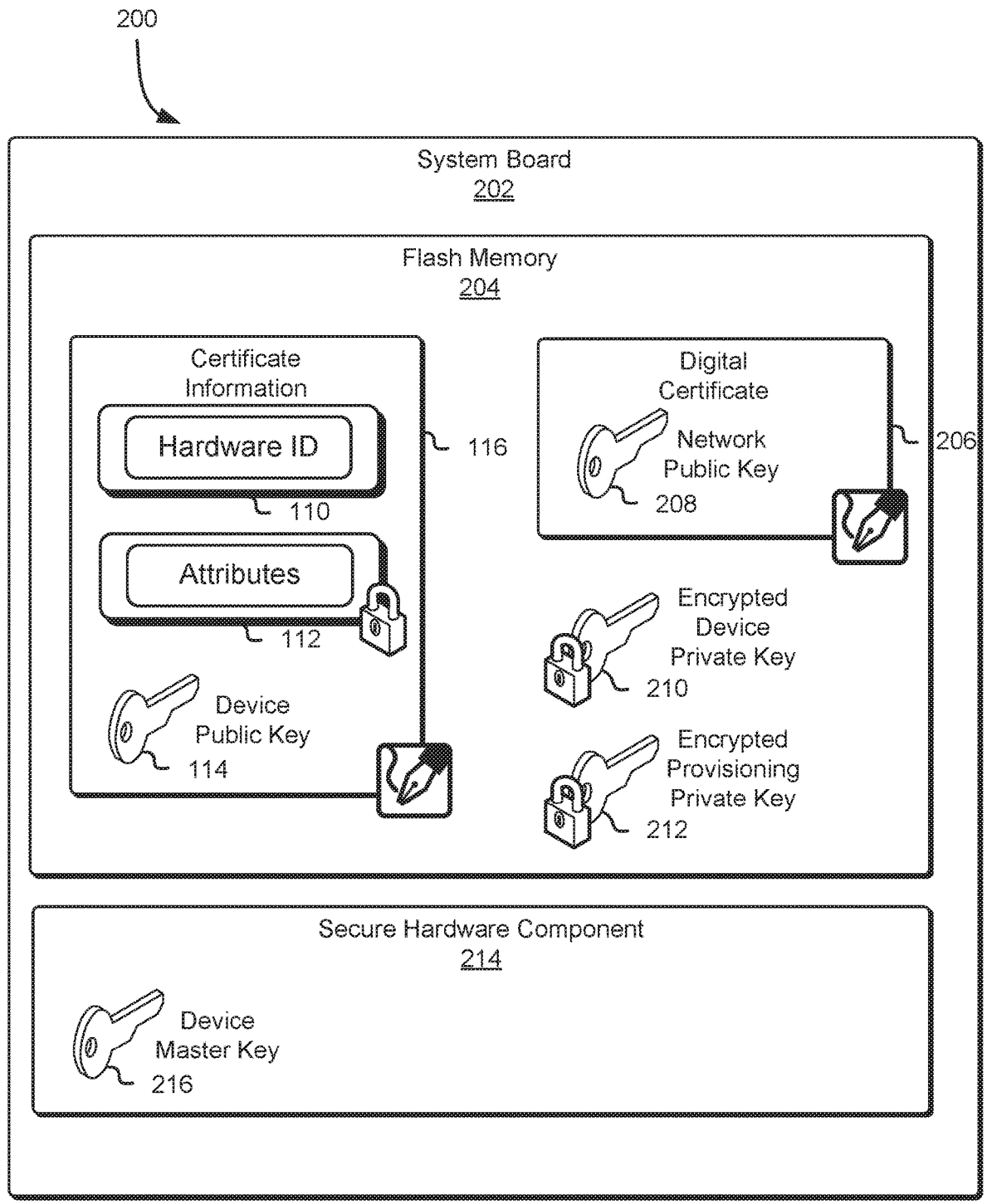
Figure 3:
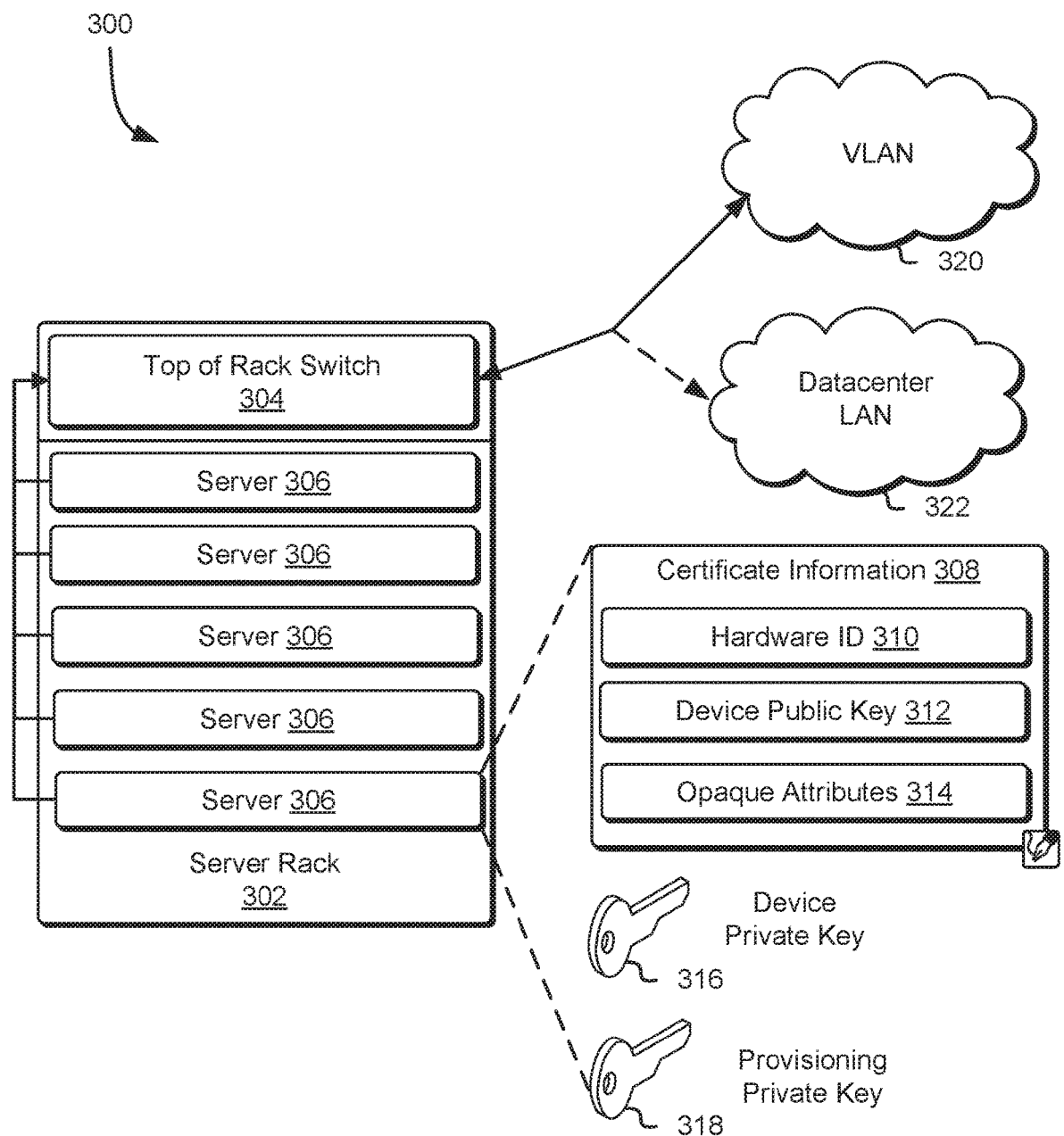
Figure 4:
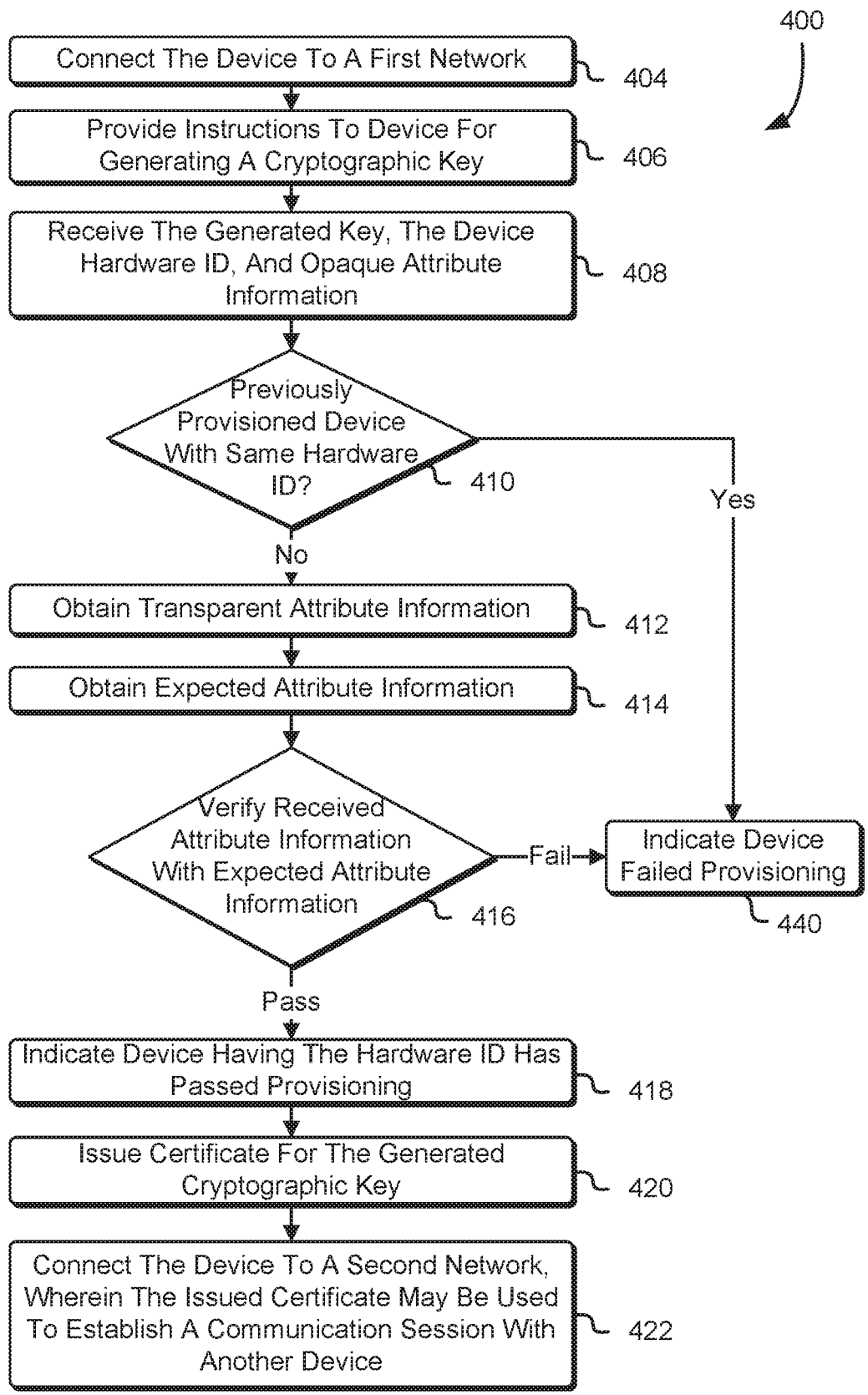
Figure 5:
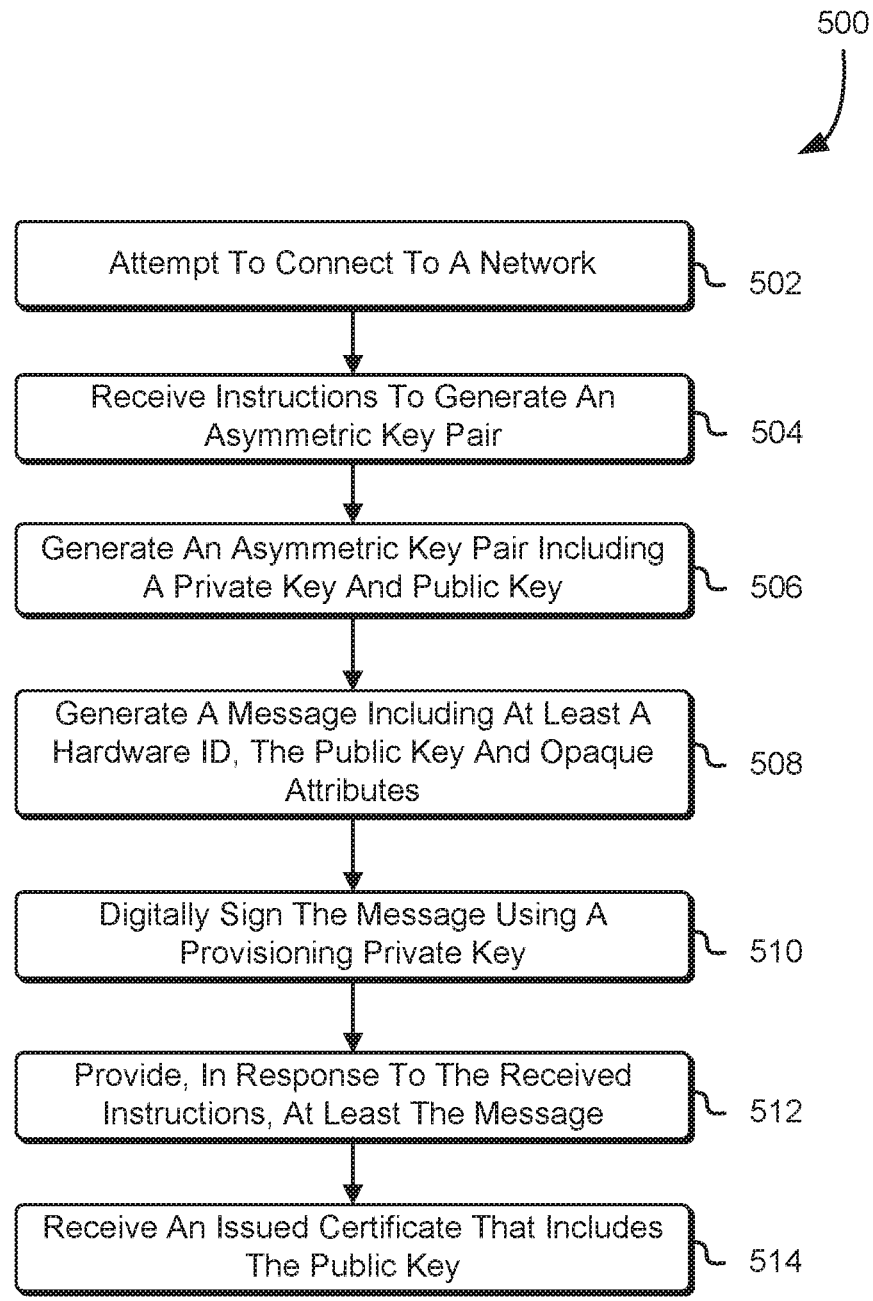
Figure 6:
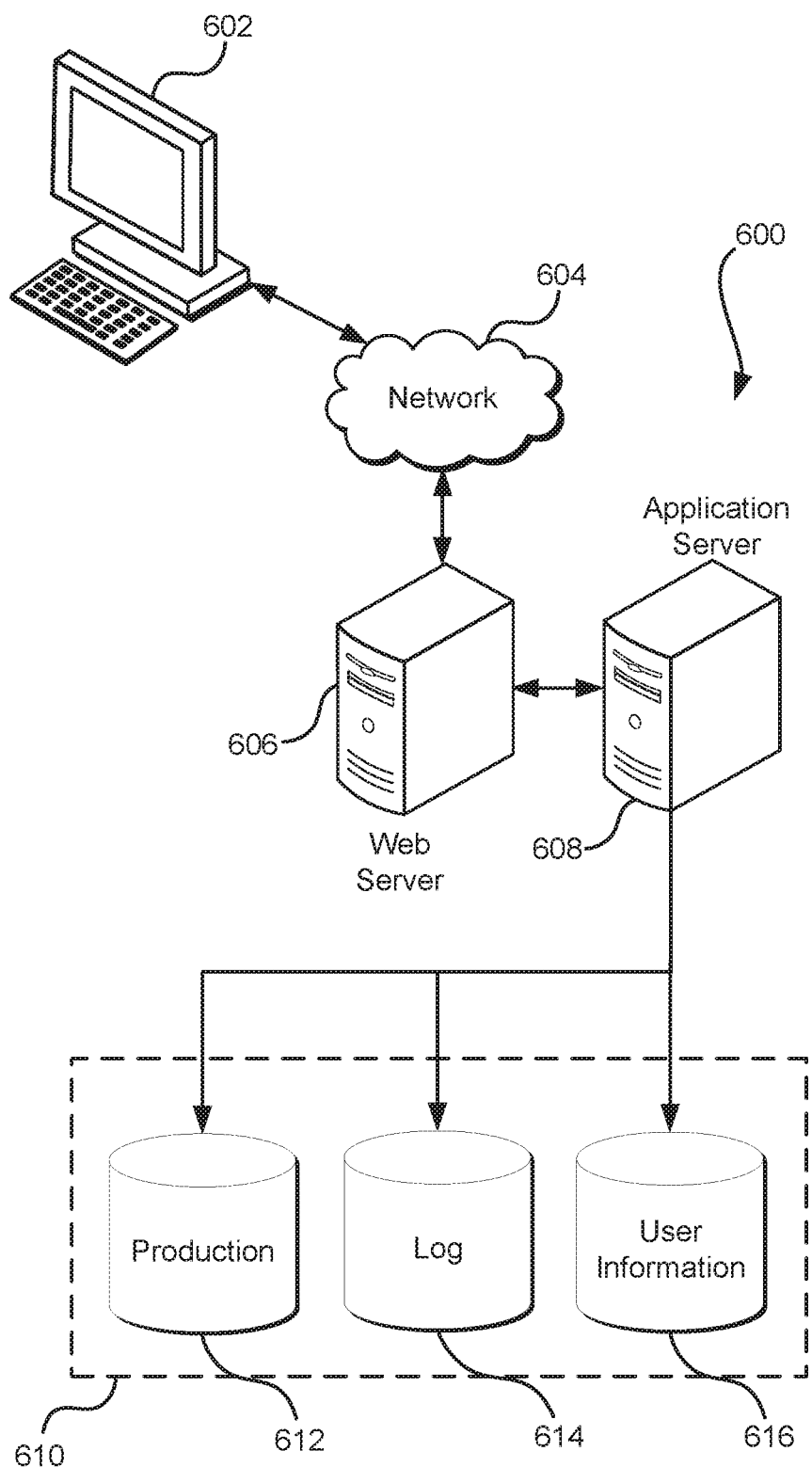

Various embodiments in accordance with the present disclosure will be described with reference to the drawings, in which:

FIG. 1 shows an illustrative example of an environment in which a device may be authenticated;

FIG. 2 shows an illustrative example of a device that may be authenticated with a system;

FIG. 3 shows an illustrative example of a hardware configuration, including a server rack, that may be authenticated with a system;

FIG. 4 shows an illustrative process for a system authenticating a device;

FIG. 5 shows an illustrative process for a device attempting to authenticate with a system; and FIG. 6 illustrates an environment in which various embodiments can be implemented.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include using a system to authenticate a device to a network. In some examples, the device may have been in physical possession by a third-party that, while unlikely, nevertheless may have the opportunity to inject malicious software and/or hardware that may be used to compromise a computer network. Examples of third-parties that may be capable of comprising the hardware include: hardware manufacturers, competitors, disgruntled employees, postal workers, government agencies (e.g., foreign governments), computer hackers, criminal organizations, and many more. A private, provisioning network may be used by the organization as part the authorization process, where unauthenticated devices must pass certain security checks to be authenticated and provisioned for use with the network.

In some examples, an organization may have a network of computers located within a datacenter or multiple datacenters. These datacenters may further include several racks of computer servers that may be connected to a network. Over time, these computer servers may be replaced (e.g., as a result of hardware failures), upgraded, etc. The datacenter may also grow over time, with additional servers or server racks being installed in the datacenter and added to the network.

In many instances, the organization may not have the necessary capabilities to manufacture computer hardware (e.g., servers and racks and/or components thereof) for a datacenter, may not have sufficient capacity to manufacture the computer hardware based on needs or expected needs for a datacenter, or may for other reasons choose not to manufacture computer hardware (e.g., use of manufacturing facilities for other purposes). As such, an organization may make use of a third-party to manufacture the computer hardware intended for use on the organization's network. The device to be used on the organization's network may further include specialized hardware, software, or a combination thereof that authorizes the device for use on the network. For example, the organization may, for each device, generate a digital certificate for the device that may be used to identify and authorize the device on a network or set of networks. In some embodiments, the digital certificate for a device may furthermore uniquely identify the device on a network or a set of networks.

In many instances, the organization may provide to the third-party manufacturer digital certificates or mechanisms for generating digital certificates that may be provisioned on devices to be used on the organization's network. In some cases, this may be done because it is required for the devices to be used on a network (e.g., devices without a digital certificate are not authorized for use on the network), whereas in other cases it may be done for reasons of efficiency.

In an embodiment, a device to be provisioned on a network is configured with a cryptographic key (e.g., a private key of an asymmetric cryptographic key pair). The device may be configured to network boot and, when powered on, may make a request as part of a network boot process (e.g., a request to install an operating system over the network). This request may be routed to a system configured to provision devices. The system may then provide executable instructions to the device that, when executed by one or more processors of the device, cause the device to generate an asymmetric key pair and provide the public key of the generated asymmetric key pair to the system. The information provided to the system that includes the generated public key can be digitally signed using a private key provisioned into the device by the manufacturer, such as in a trusted platform module (TPM) or other component that provides hardware protection of secrets stored in the component. This enables the system to check that the information was provided from a device manufactured by a manufacturer that the system is configured to trust.

The system may receive the information and confirm that the information (and/or the request received previously) was received in accordance with expected attribute information that indicates one or more attributes that the device should have to be trusted. One such attribute is a location in a data center. The expected attributes may be obtained from an electronic manifest or other mechanism for indicating expected attributes where the manifest or other mechanism may be generated and/or cryptographically verifiable independently from the device. For example, an entity associated with the system may create the manifest itself or may provide information for the manifest to the manufacturer who may generate and provide the manifest. Generally, the manifest or other mechanism that provides information indicating a set of attributes the device should have to be trusted where the device itself is not trusted for such information. In some instances, the attributes may be encrypted so as to make the underlying attribute information inaccessible to components other than the system.

If the device matches the expected attribute information, the system may issue a digital certificate that includes the public key that the device provided. The device may receive the digital certificate and use the digital certificate to authenticate to other systems, which may be on another network that is isolated from the network over which the system was accessed. In some examples, the certificate may encode some or all of the expected attribute information, e.g., because the device was provisioned by the manufacturer with it and provided it to the system and/or because the system added the expected attribute information when issuing the certificate (e.g., before the digital certificate was digitally signed by the system or another system (e.g., certificate authority)). In this manner, if the digital certificate was used to authenticate by another device, the attribute information may not match, which can cause authentication of the device to fail and appropriate action to be taken (e.g., by refusing a connection, closing a connection, preventing access to information, and/or other actions).

FIG. 1 shows a diagram 100 illustrating a context in which various techniques of the present disclosure may be utilized. In this particular example, the diagram 100 shows an environment in which an unprovisioned device 102 is being provisioned. The unprovisioned device 102 shown further includes a provisioning private key 106 and a device private key 108. In FIG. 1, the unprovisioned device 102 is shown connecting to a private virtual local area network (VLAN) 104. The VLAN 104 may allow the device to communicate with an authorization host 120. The authorization host 120 is further configured to either store or otherwise have access to a provisioning public key 122, a set of expected attributes 126, and a record of provisioned devices 128. In some embodiments, the authorization host 120 may be operable to determine whether the unprovisioned device 102 should be approved for use on a network, and approve devices for use on a network. In some embodiments, the authorization host 120 is further configurable to communicate with a key server or certificate authority that may issue a certificate allowing the device public key to be used broadly across a network of provisioned devices.

In some embodiments, the device 102 may be a computer server, rack of computer servers, or other similar hardware devices that may potentially be untrusted. For example, the hardware device may be manufactured by a trusted party but potentially exposed to an untrusted third party. Examples of such exposure may include the device having passed through a government export/import agency wherein the government agency has the opportunity to inspect and/or modify the device. A second example includes a device, being shipped from the manufacturer to a destination datacenter that may be intercepted by a malicious party that may inspect and/or modify the device. As a third example, a manufacturer having a digital certificate usable to authenticate a device to the network may create a rogue device using the digital certificate and use the rogue device at a later point in time to connect to the network. In some examples, the device is a component of a server, such as a network card or other component that can be plugged into a system board of the server, but that has independent computational resources (e.g., one or more processors and memory that stores executable instructions to be executed by the one or more processors).

Furthermore, in some embodiments, the unprovisioned device 102 may include a software-based virtual machine. A virtual machine may refer to software emulation of a computer system. For example, a software-based device may be a virtual machine instance (VMI) that connects to a network using a virtual network adapter. In some embodiments, the unprovisioned device 102 may include a combination of hardware, firmware, software, or any combination thereof—for example, a device 102 comprising hardware and software may include both a virtual machine instance and either a hardware-based hypervisor or virtual machine monitor.

As used herein, the terms "private key" and "public key" may be used to refer, respectively, to private and public keys used as part of asymmetric cryptography ("public key cryptography"). Asymmetric cryptography refers to a class of cryptographic protocols wherein the private key and public key may be mathematically linked. In public key cryptography, there is no requirement that parties exchange a shared secret. Rather, a public key may be published and may be generally available (even to untrusted parties), whereas the private key should not be revealed to untrusted parties. The key pair (of the corresponding private key and public key) may be used to perform cryptographic operations. For example, a public key may be used to encrypt a plaintext message, resulting in a ciphertext, and the corresponding private key may be used to decrypt the ciphertext, resulting in the original plaintext message. As a second example, a private key may be used to generate a digital signature authenticating a message, and the corresponding public key may be used to verify that the digital signature is correct and thus, that the message is authentic.

In some embodiments, the device 102 contains a provisioning private key 106 that may not be known or accessible by other parties such as the authentication host 120. The provisioning private key may be used by the device during the provisioning process wherein an authentication host may issue a command to the device to generate a certificate that may be used as part of the provisioning process. The provisioning private key may further be securely managed and maintained in a key store such as a Hardware Security Module (HSM). The corresponding provisioning public key 122 may be published such that it is generally available, and may, for example, be accessible by the authorization host 120. The provisioning private key may be used by the device to digitally sign certificates such as the certificate information 116 shown in FIG. 1. Certificates, messages, or other information digitally signed by using the provisioning private key may be used as evidence that the device has possession of the provisioning private key. In some embodiments, a trusted third-party such as the manufacturer or an entity trusted by the manufacturer may use a RSA key generator (not shown in FIG. 1) to generate the provisioning key pair and install the provisioning private key on one or more devices such as the device 102 shown in FIG. 1.

In some embodiments, the device 102 may further be configurable to generate one or more device key pairs (i.e., an asymmetric key pair including a private key and a corresponding public key). The device key pair may, for example, be used by parties of a network to communicate securely with the device 102 after the device has been passed a provisioning process and the device public key is authorized for use by a key server, certificate authority, or other suitable trusted party (for example, by having the aforementioned entity issue the digital certificate). The device key pair may be generated on demand, for example, based on a request to generate a device key pair over a network (e.g., by an authorization host 120 connected to the device 102 over a private VLAN 104). The request, in some embodiments, may be an API call, an HTTP request, or other type of network request. In some embodiments, the device private key 108 may be stored on the device within flash memory of a system board, and may also be stored in an encrypted format. In some embodiments, the encryption of the device private key may be performed using a symmetric-key algorithm such as the Advanced Encryption Standard (AES), where the AES key may be stored on a fuse located on the system board.

In some embodiments, the system board 202 may be dedicated, modular, hardware that may be installed onto a computer system during and/or after manufacturing of the computer system. Examples of dedicated, modular, hardware include hardware that may be connected to a computer via a Peripheral Component Interconnect (PCI) port and other similar expansion bus standard designs such as: PCI Express, PCI-X, Advanced Graphics Port (AGP), Industry Standard Architecture (ISA), and the like. Additionally, dedicated, modular, hardware may further include hardware that may be installed using various interface standards such as (but not limited to): IEEE 1394 ("FireWire") and Universal Serial Bus (USB) interfaces. In other embodiments, the system board 202 may be more permanently affixed to the computer system, for example, as a component soldered to a motherboard and required for meaningful operational use of the motherboard.

In some embodiments, the device 102 may support a pre-boot execution environment (PXE) as disclosed in the Intel® Preboot Execution Environment (PXE) Specification 2.1, which is hereby incorporated by reference. The device may, for example, be configured with a network interface controller (NIC) supporting PXE. Devices configured to support a pre-boot execution environment may be operable to boot from a server or network and/or receive instructions. For example, the device 102 may be configured to receive instructions and/or executable code from the private VLAN 104 as part of a pre-boot execution.

In some embodiments, when an unprovisioned device 102 is booted up, the unprovisioned device is routed to a private VLAN 104 that may be used to provision the device. In some embodiments, the detecting that the device is unprovisioned and the routing of the device's connection to the private VLAN may be performed by a top-of-rack switch. Alternatively, one or more of these functions may be performed by an authorization host 120. In some embodiments, the private VLAN 104 may be isolated from a broader network of provisioned devices. The isolation of a first network and second network may, for example, refer to segmenting a broader network such that different segments of the broader network have different security characteristics. As an example, a computing environment may be configured such that a first computer network may be accessible to provisioned devices and that one or more private, isolated, virtual LANs are used to authorize unprovisioned devices (i.e., segmenting of a broader network based on whether a device has been provisioned for use on the network). As an example, the top-of-rack switch of a server rack may, as part of a provisioning process, setup a private, isolated, VLAN that is used by all unprovisioned devices on the server rack. Of course, a top-of-rack switch of a second server rack, as part of a second provisioning process, may setup a second, private, isolated VLAN that may be used by all unprovisioned devices on the second server rack.

The private VLAN 104 may, in some embodiments, be dynamically created—for example, upon detection of an unprovisioned device attempting to connect to a network. Additionally, in some embodiments, a physical network may be used in place of a virtual network in the same or similar manner as described above. The private VLAN may serve as a first provisioning network that may be used by an authorization host 120 or other system to authenticate unprovisioned devices. Upon successfully provisioning a device, the device may then be routed to a second network that is connected to one or more provisioned devices (e.g., a datacenter network).

In an embodiment, a device may network boot (e.g., using PXE) on a first network. An authorization host 120 may detect that the device is attempting to boot to the network, and identify whether the device has been successfully provisioned. In some embodiments, the identifying of whether the device has been successfully provisioned may be based at least in part on information provided by the device—for example, a device that has been successfully provisioned may have access to a token that it may present as evidence that it has been successfully provisioned—and/or information available to the authorization host—for example, the authorization host may record a unique hardware identifier for each device that is successfully provisioned and check the hardware identifier of a device attempting to network boot against a database with the set of successfully provisioned devices. If the device has been provisioned, the authorization host may authenticate the device and allow the device to successfully connect to the first network and communicate with other devices on the network (e.g., other successfully provisioned devices that have been authenticated). However, if the device has not been provisioned, the authorization host 120 may create a virtual network (e.g., the private VLAN 104 of FIG. 1) and route network requests of the device through the virtual network as part of the authorization process. The creating and routing of requests to a virtual network may be based at least in part on forming an isolated security boundary where the authorization host may communicate with and attempt to provision a device, but also prevent the potentially unsafe device (e.g., a device that was tampered with and includes malicious code) from gaining broader access to provisioned devices on the network. Additionally, locally isolating (e.g., by location) one or more unprovisioned devices may also aid in alerting system administrators to the presence and location of potentially unsafe devices and where they may find the device or devices. In some embodiments, the parties connected to the private VLAN include one or more unprovisioned devices and an authorization host.

In some embodiments, an authorization host 120 may include one or more computer systems configurable to authenticate an unprovisioned device for use on a network. The authorization host may identify when an unprovisioned device attempts to connect to a network, and determine how to handle the attempted connection. For example, the authorization host 120 may create a private VLAN (such as the private VLAN 104 shown in FIG. 1) and route requests of the unprovisioned device through the private VLAN. In some embodiments, the authorization host may have stored or have access to the provisioning public key 122 corresponding to the provisioning private key 106 that the device 102 may use to digitally sign certificates such as the certificate information 116 shown in FIG. 1. The authorization host may use the provisioning public key to verify the authenticity of certificate information that is digitally signed using the provisioning private key in any suitable manner. Note that the term "certificate information" may refer to a certificate that is not signed and issued by a key server, certificate authority, or other such party trusted to issue digital certificates or, generally, information to be used in a digital certificate to be issued. Certificate information may not be trusted broadly across a network, and may, in some embodiments, not be trusted by any parties.

The authorization host 120 may further include a record of expected attributes 126. Attributes may refer to topographical information about one or more devices that, for example, associates the device to a location in a datacenter. Attributes may be used as part of a provisioning process to determine whether a device is physically present in the correct location of a datacenter, and if not, alert a system administrator, security system, or other human and/or computer entity of the device. As an example, a malicious party may, in some cases, gain access to a manufactured device and create a cloned device which the malicious party may then attempt to use to connect to the network. In many cases, the malicious party may attempt to use a remote connection (that is, connecting to a datacenter or server from a different geographical location) as to avoid, for example, needing to physically infiltrate a data center. In such cases, attribute information may be used to deny access to the cloned device, because the device, even when all hardware and software is cloned, will fail to pass the provisioning process which may identify that the cloned device is not located within the datacenter it is expected to be in, and the provisioning process will fail and furthermore, may alert a system administrator that a cloned device attempted to connect to the network. Other types of attribute information may include information on hardware components, that may, for example, require the device to have certain security hardware components and/or hardware components that are difficult, expensive, or impossible to clone. Attributes may be associated to a device, for example, through a hardware identifier. In some embodiments, the expected attributes 126 may be stored within one or more computer systems comprising the authorization host, or may be stored separately, such as on a storage-area network, online database, distributed file system, or other such storage platforms known to one skilled in the art. In some embodiments, the location contained in an attribute can be determined based on the MAC address filtering. In some embodiments, the expected attribute information may be provided by a source different from the device. For example, the authorization host may independently receive (e.g., from the manufacturer of a device via a side channel) a manifest file 130. The manifest may, for example, be a digital manifest that is provided to the system. In some embodiments, a QR code (quick response code) containing expected attribute information may be scanned, decoded, and provided to the system.

In some embodiments, the authorization host 120 contains a record of provisioned devices 128. The record of provisioned devices may include a set of hardware identifiers corresponding to devices that have previously been provisioned. Furthermore, in some embodiments, an authorization token is associated with provisioned devices such that a device attempting to connect to a network may be required to present to the authorization host the authorization token as part of an authentication process. In some embodiments, an asymmetric public key is also associated with the device and may be used as part of the authentication process. For example, an authentication process involving the use of an authorization token may require that a device attempting to connect to a network must present the authorization token associated with the device (or associated with the device's hardware identifier) and furthermore, that the provided token is digitally signed using the asymmetric private key associated with the device (or associated with the device's hardware identifier). A cryptographic nonce or other types of security measures used to prevent replay attacks and/or ensure authenticity may also be used as part of the authorization process.

An unprovisioned device 102 may, as part of a provisioning process and/or in response to a command or executable code, provide certificate information 116 to the authorization host 120. In some embodiments, the certificate information 116 may include at least a hardware identifier 110, opaque attribute information 112, and a device public key 114 corresponding to the device private key 108. In some embodiments, the certificate information may furthermore be digitally signed by the provisioning private key 106, and the digital signature's authenticity may be verifiable by a party having access to the corresponding provisioning public key (e.g., the authorization host 120 shown in FIG. 1).

In some embodiments, the certificate information may include a hardware identifier 110 that may be used (for example, by the authorization host 120) to uniquely identify a device on a network and/or attempting to connect to a network. The hardware identifier may, for example, correspond to a MAC address of a network interface controller on the device. In some embodiments, a manufacture may assign serial numbers to manufactured devices such that serial numbers are not reused by the manufacturer. In such an embodiment, the hardware identifier for a device may include a tuple comprising an identifier for the manufacturer (e.g., a manufacturer ID) and the assigned serial number. In some embodiments, virtual devices (e.g., a virtual machine instance) may be assigned a hardware identifier based at least in part on the host machine's hardware identifier. In some embodiments, the hardware identifier may be based at least in part on identifier standards such as a universally unique identifier (UUID), globally unique identifier (GUID), etc.

In some embodiments, the certificate information may not explicitly contain a hardware identifier. In such embodiments, there may be other information that may be used by a recipient of the certificate information 116 to derive a hardware identifier. For example, in some embodiments, the certificate information 116 may be provided as part of an HTTPS session between two parties, wherein the parties may, as part of a handshake process, exchange hardware identifiers. As a second example, in some embodiments, where a certificate information may be sent to a destination using an HTTP network packet, the network packet may contain information that may be usable by the receiving party to determine the identity of the owner (e.g., where the receiving party has access to a mapping table that associates IP addresses to hardware identifiers).

In some embodiments, the certificate information 116 includes attributes 112. The attributes 112 may be opaque such that they are not readable on the device 102 and the device 102 may be unable to interpret opaque attributes. As described herein, opaque data may be any form of hidden data such that it is difficult or impossible for some parties to determine the underlying hidden data given only the opaque data. In some embodiments, opaque data may be generated through the use of encryption—for example, the opaque attributes 112 may be encrypted under AES using an attribute master key 124 that is accessible by the authorization host 120 and may be kept secret from the device 102 as well as the manufacturer of the device.

In some embodiments, an attribute may include location metadata describing where in a datacenter the device should be located. Similarly, transparent data may be interpretable by a system without the need to perform cryptographic operations (e.g., decryption).

In an embodiment, an organization having a datacenter may generate an attribute specifying where in the datacenter a device should be installed, encrypt that attribute, and provide the encrypted attribute to a manufacturer. The manufacturer may, as part of the manufacturing of a device, include the encrypted attribute in the device so that it is available to be included when a certificate information (such as the certificate information 116 of FIG. 1) is generated by the device.

FIG. 2 shows an illustrative example 200 of hardware that may be included in a server that may be authenticated with a system. In an embodiment, the example hardware includes a system board 202 that may include non-volatile flash memory 204 and a secure hardware component 214. The non-volatile flash memory 204 may be used to store digital certificates and may also be used to store cryptographic keys. In some embodiments, a cryptographic key stored on flash may be encrypted, as there may not be security assurances that data stored on the flash drive may be kept confidential from other parties.

In some embodiments, the flash memory 204 may be used to store digital certificates, such as certificate information 116 described in connection with FIG. 1 that contains opaque attribute information. Furthermore, in some embodiments, the flash will also contain a digital certificate 206 with a network public key 208. The issued certificate 206 may be digitally signed by the device private key (shown in FIG. 2 in an encrypted form) and may be used to determine the authenticity of a network that it attempts to connect to. Thus, it should be appreciated by one skilled in the art that in some embodiments, certificate information 116 and digital certificate 206 may be used to mutually authenticate a device and a server/network so that both parties are assured of the other party's identity.

In some embodiments, the secure hardware component 214 is a component that may be used to securely store a private, device-specific master key 216 that is only readable by trusted firmware or hardware within the secure hardware component 214. The secure hardware component 214 may include a dedicated cryptographic processor and dedicated memory within a tamper resistant physical package that may be used to store secrets. In addition, a secure hardware component 214 may make available a digitally signed certificate attesting to the authenticity of the device master key 216. In some embodiments, the attestation includes a timestamp of when the certificate was digitally signed. In some embodiments, asymmetric private keys stored in flash may be stored in an encrypted form, such as an encrypted device private key 210 and/or an encrypted provisioning private key 212. In some embodiments, the device private key and provisioning private key may also be stored within the secure hardware component 214 and may also have corresponding digitally signed certificates attesting to the authenticity of the respective keys. Likewise, such certificates may also include timestamps attesting to when the certificates were digitally signed.

The secure hardware component 214, which may be a trusted platform module (TPM), may include a memory subsystem, including a main random access memory (RAM) for storage of instructions and data during program execution and a read only memory (ROM), in which fixed cryptographic information may be stored, such as a hardware secret stored securely within the device so as to be non-exportable (i.e., inaccessible through any call to the secure hardware component). The secure hardware component, in some embodiments, operates wholly or partly in compliance with Trusted Computing Group's TPM Main Specification level 2, Version 1.2, Revision 116, TPM Main Specification level 2, Version 1.2, Revision 103 and/or ISO/IEC 11889, which are incorporated herein by reference. The device may also store cryptographic keys in RAM and/or processor registers for temporary cryptographic processing. The cryptographic information stored in memory may be used in combination with cryptographic information obtained via a network interface and/or one or more user interface input devices. One or more cryptographic processors may be used to perform cryptographic operations in the device and may include a random number generator, SHA-2 or other hash generator and an encryption-decryption-signature engine.

In some embodiments, the secure hardware component may be a TPM that is configured to create asymmetric key pairs such that the private key of the corresponding asymmetric key pair is stored within the device in a manner so as to be non-exportable. The TPM may further include an attestation identity key that may be used to prove that certain cryptographic operations occurred within the TPM. For example, in some embodiments, the provisioning private key may be an attestation identity key that is securely stored within a TPM as to be non-exportable. The TPM may be further configurable to generate a remote attestation by which an authorization host (e.g., an authorization host described in connection with FIG. 1) may determine the level of trust of the server. The remote attestation may, for example, be included in certificate information 116 including a device public key generated by the TPM, wherein the certificate information is signed by the attestation identity keg (e.g., a provisioning private key securely stored within the TPM so as to be non-exportable). The remote attestation may be provided to an authorization host that determines whether to trust the server hardware by verifying the digital signature using the provisioning public key.

The one or more cryptographic processors may also be configured to perform one or more encryption/decryption algorithms in accordance with one or more cryptographic algorithms, such as public key and/or private key cryptographic algorithms. For example, as discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, blowfish, CASTS, RC4 and the international data encryption algorithm (IDEA). Symmetric key algorithms may also include those used to generate output of one way functions and include, but are not limited to, algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include, but are not limited to, those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure. Generally, one or more components of the secure hardware component may be configured to collectively perform various operations used generating cryptographically verifiable information for authentication objects.

As noted above, in various embodiments of the present disclosure, hardware secrets are securely stored within the secure hardware component. In some embodiments, the cryptographic module is implemented as or may contain a physically unclonable function (PUF), which is a function implemented in physical hardware to use one or more hardware secrets that are based at least in part on physical characteristics of the PUF. As a result, any attempt to obtain a hardware secret may require physical intrusion into the PUF and physical intrusion may alter the physical characteristics of the PUF, thereby destroying the hardware secret. Example PUFs that may be used include PUFs using explicitly-introduced randomness, optical PUFs, coating PUFs, PUFs using intrinsic randomness, delay PUFs, static random access memory (SRAM) PUFs, butterfly PUFs, bistable ring PUFs, magnetic PUFs, metal resistance PUFs and/or other devices whose physical characteristics encode information usable as or for a hardware secret.

FIG. 3 shows an illustrative example 300 of example hardware that may be provisioned with a network. The example 300 includes a server rack 302 comprising a top-of-rack switch 304 and a set of servers 306. In an embodiment, an organization may have a datacenter and instruct a third party to manufacture at least part of the server rack (including its constituent parts) for use in the datacenter. The organization may further provide the manufacturer with an opaque attribute that is to be stored on a server of the server rack. In some embodiments, each server of the server rack has a corresponding opaque attribute that should be stored on the server which may be used during the provisioning process to authorize the server for use on a network. As described above in connection with FIGS. 1 and 2, each of the one or more servers of a server rack may include a certificate information 308 that may include, for example, a hardware identifier 310, a device public key 312, and opaque attributes 314. The certificate information may further be signed by a provisioning private key that is accessible by a server of the server rack. Additionally, each of the one or more servers of a server rack may further include, for example on a system board, a device private key 316 and a provisioning private key 318 as described above in connection with FIGS. 1 and 2.

In some embodiments, a server rack may include a top-of-rack switch that may be connected to one or more servers of the server rack. Typically, in such a configuration, the servers are connected to the top-of-rack switch, and the top-of-rack switch is connected, or may be connected, to the network. A top-of-rack switch may refer to a switch that is used to connect all (or some) devices on a rack; the top-of-rack switches may further be connected to aggregation switches which are in turn connected to the network or even a second-level aggregation switch. It should be noted that, for the purposes of this disclosure, top-of-rack switch does not refer to the location of the switch on the network, but rather a network design architecture—it should be noted that a top-of-rack switch may not physically be located on top of a server rack. Additional network design architectures, such as end-of-row switching, may also be utilized to connect one or more devices to the network in the same or similar manner as described above in connection with top-of-rack switching. Note that the authenticating of devices includes not only authenticating and provisioning servers in such a configuration, but also authenticating and provisioning switches for use on the network.

In some embodiments, network communications between the one or more servers 306 of a server rack and a network (e.g., virtual LAN 320) are routed through the top-of-rack switch 304 of the server rack. The top-of-rack switch may, in some embodiments, initially route network traffic on all ports to the virtual LAN 320 which may be used to provision the one or more servers 306 of a server rack, and after being successfully provisioned, route some (or all) network traffic to a datacenter LAN 322 that may include several provisioned and authorized devices. It should be noted that while in some embodiments the rack switch is initially configured to route uplink network traffic on all ports to the VLAN, the top-of-rack switch may instead (or in addition) receive instructions or executable code (e.g., from an authorization host) to route uplink network traffic to a VLAN. Additionally, in some embodiments, the top-of-rack switch may be manually configurable (e.g., by an operator or system administrator) to route uplink traffic to a distinct VLAN. Note that additional network design architectures such as end-of-row switching, instead of top-of-rack switching, may be utilized in the same or similar manner. In some embodiments, the datacenter LAN 322 may be configured to authenticate a device when it attempts to connect to the network. The authentication of a device to the datacenter LAN may include, for example, requesting that the device connecting to the network provide a digital certificate including attribute information (e.g., location metadata) that can be verified (e.g., by an authorization host). The verification of attribute information may, for example, be performed by an authorization host in connection with the process described below in FIG. 4.

In some embodiments, the top-of-rack switch may be configurable to inspect the opaque attributes, transform the opaque attributes to a readable format, and determine whether a server providing the inspected attributes should be authorized on the network. In some embodiments, the top-of-rack switch may have access to a provisioning public key that may be used to verify the digital signature of the certificate information 308, may have access to an attribute master key that may be used to transform (e.g., decrypt) opaque attributes to a readable format. Mappings and other mechanisms different from decryption may be used to render opaque data interpretable, depending on the particular manner in which the data is made opaque.

FIG. 4 shows an illustrative example of a process 400 for provisioning a device to a network. The process 400 may be performed by any suitable system such as an authorization host as described above in connection with FIG. 1, or a top-of-rack switch described above in connection with FIG. 3. In an embodiment, the system performing the process 400 may connect 404 the device to a first network and re-route all outbound network traffic from the device to the first network. The first network may, for example, be a private VLAN that may be used to provision the device. In some embodiments, the VLAN may further be isolated from a second network that includes one or more provisioned devices. In some embodiments, a top-of-rack switch connected to one or more servers of a server rack may be configured to route all outbound network traffic (i.e., uplink network traffic sent by the one or more servers of the server rack) to the VLAN.

In an alternative embodiment, the device may first attempt to connect to a second network, but the system, upon determining that the device is an unprovisioned device using any of the methods described above, including, but not limited to requesting a token as evidence that the device has been successfully provisioned (wherein the token may further be included in a digital certificate); requesting the devices' unique hardware identifier and checking whether the hardware identifier has previously been provisioned by the system; and more. In such an embodiment, the system may re-route traffic directed for the second network to the first network.

The system may, over the VLAN, provide 406 instructions to the device for generating a cryptographic key. The instructions may be in the form of a request, a response, executable instructions, etc. and may require that the server provide the cryptographic key in a cryptographically secure format (e.g., in an encrypted form, in a digital certificate signed by a trusted key). In some embodiments, the cryptographic key may be an asymmetric public key. In some embodiments, the device may be required to provide additional information such as the server's hardware identifier, attributes (which may be of a readable or opaque format), or some combination thereof. As well, the device may be required to provide such additional information in a cryptographically secure format.

The system may receive 408 a generated cryptographic key and, in some embodiments, additional information required such as a hardware identifier and opaque attribute information. In some embodiments, the system receives 408 this information in the form of a certificate information that is digitally signed by a trusted key (e.g., the provisioning private key described in connection with FIG. 1). In some embodiments, the information may be included in one or more digital certificates (or, generally, certificate information), provided that each digital certificate of the one or more digital certificates can be verified by the system.

In some embodiments, the system may check 410 whether there exists a previously provisioned device with the same hardware identifier. In some embodiments, the system determines the device's hardware identifier by extracting the hardware identifier from a provided digital certificate. In some embodiments, the system may use other information (such as a packet header) to determine the hardware identifier of the device. If the system determines that another device with the same hardware identifier has already been provisioned, the system may indicate 440 that the device failed provisioning. In some embodiments, a system administrator may be dispatched to investigate the failure, which may be caused, in some examples maliciously (e.g., as a result of cloned hardware or replay attack) or benign (e.g., a server hardware failure, causing the device to appear to be unprovisioned).

If the system determines that there was no previously provisioned device with the same hardware identifier, in some embodiments the system may obtain 412 transparent attribute information (i.e., attribute information that can be interpreted by the system). The transparent attribute information may be obtained, for example, by performing one or more cryptographic functions, reverse hashes, mathematical operations, or some combination thereof.

The system, in an embodiment, may also obtain 414 expected attribute information. In some embodiments, the expected attribute information may be obtained from a repository of attribute information such as the store described above in connection with FIG. 1. Note that in some embodiments, the expected attribute information may be obtained 414 before, in parallel, or non-deterministically in relation to the obtaining of the transparent attribute information.

The system then verifies 416 the received transparent attribute information with the expected attribute information. Generally, the system determines based on information it has obtained whether the device matches the expected attribute information. In some embodiments, comparing the received attribute information with the expected attribute information may be used as an authentication check to ensure that the provided certificate information contains the expected tuple of information. For example, the verification may be used to detect cases where a malicious party may form fraudulent certificate information by copying the transparent attribute information of a previously provisioned device. In some embodiments, the system will indicate 440 the server failed to provision if the received attribute information and the expected attribute information do not match.

In some embodiments, attribute information may include location metadata, such as an indication of a location in a datacenter. In some embodiments, the location of a device may be determined at least in part by a top-of-rack switch of a device (e.g., a server) on a server rack. Additionally, MAC filtering on the top-of-rack switch may be used, in conjunction with identifying a particular port on a particular top-of-rack switch to determine the location of the device. In an embodiment, the uplink of a top-of-rack switch may be configured or initialized to put the uplink traffic on a provisioning VLAN.

If the verification 416 passes, the system may indicate 418 that the device has passed provisioning. In some embodiments, the system may record the device's hardware identifier in a database of provisioned devices, may provide a token indicating the device has successfully been provisioned, or some combination thereof. The system may also issue 420 a digital certificate for the generated cryptographic key that indicates that the cryptographic key is a trusted key that may be used within a network of provisioned devices. In some embodiments, the issuance of the digital certificate may be performed by a key server, certificate authority or other third party that may be trusted to issue digital certificates on a network. In some embodiments, the entire contents of the provided, certificate information may be issued by a key server or certificate authority (e.g., in connection with FIG. 1, an issued certificate may include a hardware identifier, attribute information, and a device public key); alternatively, the system may issue a digital certificate that is only based in part on the provided, certificate information (e.g., in connection with FIG. 1, an issued certificate may include attribute information and a device public key, but no hardware identifier; other combinations may also be possible). Note that steps 418-420 may be performed in any order relative to each other, may be performed in parallel, and do not necessarily need to be performed in a deterministic order.

Finally, in some embodiments, the issued certificate may be used to connect 422 the device to a second network and establish a communications session with another provisioned device. The communication session may, for example, be a SSL or TLS session. In some embodiments, the certificate used above in step 420 may be used to authenticate the device with the counterparty, for example, as part of a TLS handshake protocol. In some embodiments, establishing a communication session with another provisioned device on the second network may include verifying attribute information (e.g., in the manner described above in connection with step 416) that is contained within an issued certificate. For example, as part of establishing a handshake with another device, the successful completion of the handshake may be contingent upon verifying the device's attribute information (e.g., location metadata) in the issued certificate with expected attribute information.

FIG. 5 shows an illustrative example of a process 500 for provisioning an unprovisioned device to a network. The process 500 may be performed by any suitable system such as a server described in connection with FIGS. 1-3. In an embodiment, the device performing the process 500 attempts 502 to connect to a network. The attempt 502 may be a network boot (e.g., using PXE) and, for example, an installation of an operating system to the device over the network using PXE. The device may, in response to the attempt 502, receive 504 instructions to generate an asymmetric key pair. The instructions may be in the form of a request, response, executable code, or any combination thereof. In some embodiments, the instructions may further require the device to provide attribute information (which may further be required to be in an opaque format), hardware identifier, etc. Note that in some embodiments, the received instructions may instruct the device to generate, more generally, a cryptographic key.

In response to the received instructions, the device may generate 506 an asymmetric key pair (or more generally, in some embodiments, a cryptographic key). In some embodiments, the private key of the asymmetric key pair may be stored locally on the device, for example on flash located on a system board in accordance with an embodiment described above in connection with FIG. 2. Furthermore, the private key may be stored in an encrypted format. In some embodiments, the private key may be stored in a fuse or other type of one-time programmable non-volatile memory.

The device may generate 508 a message that, in some embodiments, includes the device's hardware identifier, the generated public key, attribute information (that may be in an opaque format). The message may be digitally signed 510 by a provisioning private key described above in connection with FIG. 1 whose corresponding public key may be made available to parties attempting to verify the authenticity and integrity of the message. An example of a digitally signed message may be certificate information as described above in connection with FIG. 1. Note that messages (and certificate information) digitally signed by the device using the provisioning public key are not necessarily trusted to the same extent as, for example, certificates issued by a key server or certificate authority. Then, the device may provide 512, in response to the received instructions, at least the certificate information.

In some embodiments, the device may receive 514 an issued certificate, wherein the issued certificate includes at least the public key. The receiving of an issued certificate may, in some embodiments, indicate that the device has successfully passed provisioning and may be authorized to access and use a second network. Furthermore, the certificate, which may have been issued by a key server or certificate authority, may be operable to allow the device to establish communications sessions with other devices on the network (for example, establishing a SSL or TLS session with another provisioned device).

FIG. 6 illustrates aspects of an example environment 600 for implementing aspects in accordance with various embodiments. As will be appreciated, although a web-based environment is used for purposes of explanation, different environments may be used, as appropriate, to implement various embodiments. The environment includes an electronic client device 602, which can include any appropriate device operable to send and/or receive requests, messages or information over an appropriate network 604 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 606 for receiving requests and serving content in response thereto, although for other networks an alternative device serving a similar purpose could be used as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 602 and the application server 608, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 610 can include several separate data tables, databases, data documents, dynamic data storage schemes and/or other data storage mechanisms and media for storing data relating to a particular aspect of the present disclosure. For example, the data store illustrated may include mechanisms for storing production data 612 and user information 616, which can be used to serve content for the production side. The data store also is shown to include a mechanism for storing log data 614, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. The application server 608 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 602. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIF S") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information.

The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising, at a device:
    obtaining, from a computing entity over a first network, instructions to generate an asymmetric key pair, the asymmetric key pair including at least a first public key and a first private key;
    generating the asymmetric key pair according to the instructions;
    obtaining information comprising:
        the first public key; and
        encrypted device attribute information, the encrypted device attribute information encrypted using a cryptographic key inaccessible to the device;
    digitally signing the information using a second private key, wherein a second public key corresponding to the second private key is accessible to the computing entity to determine whether the information is authentic;
    providing the information to the computing entity;
    obtaining an indication from the computing entity that the device attribute information matches one or more expected attributes to be obtained from a source different from the device; and
    contingent on the device attribute information matching the one or more expected attributes, authenticating to a second network.

2. The computer-implemented method of claim 1, wherein generating the asymmetric key pair comprises using a trusted platform module (TPM) of the device to generate at least the first private key of the asymmetric key pair.

3. The computer-implemented method of claim 2, wherein the second private key is associated with a manufacturer of the device.

4. The computer-implemented method of claim 1, further comprising attempting to connect to the first network as part of a network boot; and
    wherein the instructions to generate the asymmetric key pair are obtained as a result of attempting to connect to the first network.

5. The computer-implemented method of claim 1, wherein the first network and the second network are virtual local area networks.

6. A system comprising memory storing a set of instructions which, as a result of execution by one or more processors, cause the system to:
    obtain, from a computing entity over a first network, instructions to generate an asymmetric key pair, the asymmetric key pair including at least a first public key and a first private key;
    generate the asymmetric key pair according to the instructions;
    obtain information comprising:
        the first public key; and
        encrypted device attribute information, the encrypted device attribute information encrypted using a cryptographic key inaccessible to the system;
    digitally sign the information using a second private key, wherein a second public key corresponding to the second private key is accessible to the computing entity to determine whether the information is authentic;
    provide the information to the computing entity;
    obtain an indication from the computing entity that the device attribute information matches one or more expected attributes to be obtained from a source different from the system; and contingent on the device attribute information matching the one or more expected attributes, authenticate to a second network.

7. The system of claim 6, wherein the set of instructions to generate the asymmetric key pair comprise instructions that, as a result of execution by the one or more processors, cause the system to store at least the first private key in non-volatile flash storage.

8. The system of claim 7, wherein the instructions to cause the system to store at least the first private key in the non-volatile flash storage are instructions that, as a result of execution, cause the system to store the first private key in the non-volatile flash storage in an encrypted format.

9. The system of claim 6, wherein:
the indication comprises a digital certificate for the first public key; and
the instructions to authenticate to the second network comprise instructions that, as a result of execution by the one or more processors, cause the system to provide the digital certificate to another system of the second network as part of a handshake protocol.

10. The system of claim 6, wherein the first network is isolated from the second network.

11. The system of claim 6, wherein the information further comprises a hardware identifier associated with the system.

12. The system of claim 6, wherein the first network is a private virtual local area network (VLAN).

13. The system of claim 6, wherein the second private key is associated with a manufacturer of the system.

14. A non-transitory computer-readable storage medium storing executable instructions that, as a result of execution by one or more processors of a computer system, cause the computer system to at least:
obtain, from a computing entity over a first network, instructions to generate an asymmetric key pair, the asymmetric key pair including at least a first public key and a first private key;
generate the asymmetric key pair according to the instructions;
obtain information comprising:
the first public key; and
encrypted device attribute information, the encrypted device attribute information encrypted using a cryptographic key inaccessible to the computer system;
digitally sign the information using a second private key, wherein a second public key corresponding to the second private key is accessible to the computing entity to determine whether the information is authentic;
provide the information to the computing entity;
obtain an indication from the computing entity that the device attribute information matches one or more expected attributes to be obtained from a source different from the computer system; and
contingent on the device attribute information matching the one or more expected attributes, authenticate to a second network.

15. The non-transitory computer-readable storage medium of claim 14, wherein the instructions to generate the asymmetric key pair comprises instructions that, as a result of execution by the one or more processors, cause the computer system to:
determine at least the first private key;
encrypt the first private key using a second cryptographic key, wherein the second cryptographic key is stored in a secure hardware component of the computer system; and
store the encrypted first private key in flash memory of the computer system.

16. The non-transitory computer-readable storage medium of claim 14, wherein the instructions to generate the asymmetric key pair comprises instructions that, as a result of execution by the one or more processors, cause the computer system to persist, within one-time programmable non-volatile memory, the first private key.

17. The non-transitory computer-readable storage medium of claim 16, wherein the instructions, as a result of execution by the one or more processors, further cause the computer system to provide a cryptographically verifiable attestation that the first private key was persisted within one-time programmable non-volatile memory as a result of obtaining the instructions to generate the asymmetric key pair.

18. The non-transitory computer-readable storage medium of claim 14, wherein the instructions, as a result of execution by the one or more processors, further cause the computer system to connect to the first network to perform a network boot.

19. The non-transitory computer-readable storage medium of claim 18, wherein the instructions to perform the network boot are instructions that, as a result of execution by the one or more processors, cause the computer system to use a Preboot Execution Environment (PXE) to install an operating system.

20. The non-transitory computer-readable storage medium of claim 14, wherein the information further comprises a hardware identifier of the computer system.

* * * * *